(12) United States Patent
Mauritz

(10) Patent No.: US 10,986,536 B2
(45) Date of Patent: *Apr. 20, 2021

(54) RANDOM ACCESS PREAMBLE DESIGN

(71) Applicant: Huawei Technologies Co., Ltd., Shenzhen (CN)

(72) Inventor: Oskar Mauritz, Johanneshov (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,455

(22) Filed: May 19, 2020

(65) Prior Publication Data

US 2020/0280881 A1 Sep. 3, 2020

Related U.S. Application Data

(63) Continuation of application No. 16/378,096, filed on Apr. 8, 2019, now Pat. No. 10,708,817, which is a (Continued)

(30) Foreign Application Priority Data

Apr. 30, 2007 (CN) .......................... 200710074200.1

(51) Int. Cl.
*H04W 28/06* (2009.01)
*H04J 13/00* (2011.01)
(Continued)

(52) U.S. Cl.
CPC ....... *H04W 28/065* (2013.01); *H04J 13/0055* (2013.01); *H04W 74/0833* (2013.01); *H04J 13/14* (2013.01)

(58) Field of Classification Search
CPC .............. H04W 28/065; H04W 28/02; H04W 74/0833; H04W 74/08; H04J 13/0055; H04J 13/0007; H04J 13/14; H04J 13/10
(Continued)

(56) References Cited

U.S. PATENT DOCUMENTS 6,963,600 B1 11/2005 Fan et al.
7,720,161 B1 5/2010 Dogan et al.
(Continued)

FOREIGN PATENT DOCUMENTS

CN 1297628 A 5/2001
CN 1613193 A 3/2002
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 3GPP TS 36.300 V8.0.0, Mar. 2007, 82 pages, France.
(Continued)

*Primary Examiner* — Kwang B Yao
*Assistant Examiner* — Syed M Bokhari
(74) *Attorney, Agent, or Firm* — Slater Matsil, LLP

(57) ABSTRACT

A communication method performed by a base station in a wireless communication network is disclosed. The base station notifies a terminal of a cyclic shift increment $N_{CS}$ configuration information indicating an $N_{CS}$ value. The base station then receives from the terminal a random access preamble related to the $N_{CS}$ value indicated by the $N_{CS}$ configuration information. The $N_{CS}$ value belongs to a set of cyclic shift increments including all of the following cyclic shift increments of 0, 13, 15, 18, 22, 26, 32, 38, 46, 59, 76, 93, 119, 167, 279, and 419.

28 Claims, 3 Drawing Sheets

Related U.S. Application Data continuation of application No. 14/557,088, filed on Dec. 1, 2014, now Pat. No. 10,285,092, which is a continuation of application No. 14/045,554, filed on Oct. 3, 2013, now Pat. No. 8,913,696, which is a continuation of application No. 12/605,616, filed on Oct. 26, 2009, now Pat. No. 8,599,974, which is a continuation of application No. PCT/CN2008/070768, filed on Apr. 22, 2008.

(51) Int. Cl.
  *H04W 74/08* (2009.01)
  *H04J 13/14* (2011.01)

(58) Field of Classification Search
  USPC .......................................................... 370/329
  See application file for complete search history.

(56) References Cited

U.S. PATENT DOCUMENTS

| | | |
|---|---|---|
| 7,738,356 B2 | 6/2010 | Kim |
| 7,778,151 B2 | 8/2010 | Bertrand et al. |
| 7,792,212 B2 | 9/2010 | Lee et al. |
| 8,098,745 B2 | 1/2012 | Bertrand et al. |
| 8,234,325 B2 | 7/2012 | Lee et al. |
| 8,345,804 B2 | 1/2013 | Song et al. |
| 8,477,698 B2 | 7/2013 | Lee et al. |
| 8,693,412 B2 | 4/2014 | Jarni et al. |
| 8,693,573 B2 | 4/2014 | Lee et al. |
| 8,724,676 B2 | 5/2014 | Lakkis |
| 8,787,957 B2 | 7/2014 | Vujcic et al. |
| 8,861,473 B2 | 10/2014 | Noh et al. |
| 9,118,531 B2 | 8/2015 | Lee et al. |
| 2004/0001529 A1 | 1/2004 | Cai |
| 2005/0103168 A1 | 5/2005 | Wei |
| 2006/0056528 A1 | 3/2006 | Jung et al. |
| 2006/0126573 A1 | 6/2006 | Dick et al. |
| 2006/0244653 A1 | 11/2006 | Szajnowski |
| 2007/0230600 A1 | 10/2007 | Bertrand et al. |
| 2008/0194259 A1 | 8/2008 | Vujcic et al. |
| 2008/0235314 A1* | 9/2008 | Lee .................... H04J 13/14 708/426 |
| 2009/0213813 A1 | 8/2009 | Futagi et al. |
| 2010/0034155 A1 | 2/2010 | Noh et al. |
| 2010/0074372 A1 | 3/2010 | Mauritz |
| 2010/0105405 A1 | 4/2010 | Vujcic |
| 2012/0051292 A1 | 3/2012 | Mauritz |
| 2012/0263214 A1 | 10/2012 | Lee et al. |

FOREIGN PATENT DOCUMENTS

| | | |
|---|---|---|
| CN | 1350379 A | 5/2002 |
| CN | 101299620 A | 11/2008 |
| CN | 101542953 A | 9/2009 |
| JP | 2002536870 A | 10/2002 |
| JP | 2010519867 A | 6/2010 |
| JP | 2010525694 A | 7/2010 |
| WO | 03081797 A1 | 10/2003 |

OTHER PUBLICATIONS

"3rd Generation Partenship Project; Technical Specification Group Radio Access Network; Physical Channels and Modulation (Release 8)," 3GPP TS 36.211, V1.0.0, Mar. 2007, 30 pages.

3rd Generation Partnership Project; Technical Specification Group Radio Access Network; Physical layer procedures (Release 8), 3GPP TS 36.213 V1.0.0, Mar. 2007, 11 pages.

"A Novel Spreading Sequence Set Applied in Qua si2synchronous CDMA System," Journal of Telemetry, Tracking, and Command, May 2006, Vo. 27, No. 3, 5 pages.

Exhibit 892-1, Samsung's Invalidity Contentions for U.S. Pat. No. 8,416,892 in view of U.S. Pat. No. 8,477,698 to Lee, et al., Jan. 21, 2017, 32 pages.

Exhibit 892-10, Samsung's Invalidity Contentions for U.S. Pat. No. 8,416,892 ("892 Patent") in View of Ghosh Et Al., Random Access Design for Umts Air-Interface Evolution, Ieee ("Ghosh"), Jan. 21, 2017, 31 Pages.

Exhibit 892-11, Samsung's Invalidity Contentions for U.S. Pat. No. 8,416,892 ("892 Patent") in View of Cyclic Shift Values for E-Utra Prach, Texas Instruments & LG Electronics, 3GPP TSG RAN WG1 #50bis (R1-074147), Jan. 21, 2017, 15 Pages.

Exhibit 892-2, Samsung's Invalidity Contentions for U.S. Pat. No. 8,416,892 in view of U.S. Pat. No. 8,234,325 to Lee, et al., Jan. 21, 2017, 37 pages.

Exhibit 892-3, Samsung's Invalidity Contentions for U.S. Pat. No. 8,416,892 in view of Zadoff-Chu Sequence Allocation on Rach for Complexity Reduction, Panasonic & NTT Docomo, TSG-RAN WG1 Meeting #47bis (R1-07018), Jan. 21, 2017, 19 pages.

Exhibit 892-4, Samsung's Invalidity Contentions for U.S. Pat. No. 8,416,892 (892 Patent) in View of Outstanding Issues in Random Access Preamble Design for E-Utra, Texas Instruments, TSG RAN WG1 #48bis (R1-071471), Jan. 21, 2017, 17 pages.

Exhibit 892-5, Samsung's Invalidity Contentions for U.S. Pat. No. 8,416,892 (892 Patent) in View of Preamble Allocation for Non-Synchronization Rach, Lg Electronics, 3GPP TSG RAN WG1 Meeting #49 (R1-07233), Jan. 21, 2017, 19 Pages.

Exhibit 892-6, Samsung's Invalidity Contentions for U.S. Pat. No. 8,416,892 (892 Patent) in View of Using Restricted Preamble Set for Rach in High Mobility Environments, Samsung, 3GPP TSG RAN WG1 Meeting #48bis (R1-071560), Jan. 21, 2017, 30 Pages.

Exhibit 892-7, Samsung's Invalidity Contentions for U.S. Pat. No. 8,416,892 (892 Patent) in View of Design for Restricted Set of Cyclic Shifts, LG Electronics, 3GPP TSG RAN WG1 #48BIS (R1-071697), Jan. 21, 2017, 19 Pages.

Exhibit 892-8, Samsung's Invalidity Contentions for U.S. Pat. No. 8,416,892 (892 Patent) in View of U.S. Patent Application Publication No. 2007/0230600 (Bertrand), Jan. 21, 2017, 26 Pages.

Exhibit 892-9, Samsung's Invalidity Contentions for U.S. Pat. No. 8,416,892 (892 Patent) in View of Random Access Preamble L1 Parameters in E-Utra, Texas Instruments, 3GPP TSG RAN WG1 #50 (R1-073435), Jan. 21, 2017, 18 Pages.

Exhibit 892-B, "Motivation to Combine References," Jan. 21, 2017, 68 pages.

Ghosh et al., "Random Access Design for UMTS Air-Interface Evolution," Published in Vehicular Technology Conference, 2007, VTC2007-Spring, IEEE 65th, pp. 1041-1045.

Samsung, et al., "Samsung's Patent Local Rule 3-3 and 3-4 Disclosures," Case No. 16-cv-02787-WHO, Jan. 21, 2017, 17 pages.

Hyeon, Yeon, et al., Configuration of Cyclic Shift Set U.S. Appl. No. 60/915,415, filed May 1, 2007, 22 pages.

Popovic et al., "Random Access Preambles for Evolved UTRA Cellular System," Invited Paper, 2006 IEEE Ninth International Symposium on Spread Spectrum Techniques and Applications, pp. 488-492.

Popovic, "Efficient matched filter for the generalized chirp-like polyphae sequences," Aerospace and Electronic Systems, IEEE Transactions on Volumne 30, Issue 3, Jul. 1994, 9 pages.

Popovic, "Generalized chirp-like polyphase sequences with optimum correlation properties," Information Theory, IEEE Transactions on vol. 38, Issue 4, Jul. 1992, 4 pages.

Qualcomm Europe, "RACH sequence structure and evaluation," 3GPP TSG-RAN WG1, Discussion and Decision, Agenda item: 8.3.1, R1-062048, Aug. 28-Sep. 1, 2006, 4 pages.

LGE, "RACH Sequence Design Based on Repetition Method," Discussion, 3GPP TSG RAN1 LTE WG1 Meeting #46bis, Agenda Item: 6.4.3, R1-062556, Oct. 9-Oct. 13, 2006, 8 pages.

Texas Instruments, "Configurable Cyclic Shift for Non Synchronized Random Access preamble," 3GPP TSG RAN WG1 #46bis, R1-062631, Seoul, South Koreas, Oct. 9-13, 2006, 3 pages.

Texas Instruments, "Non Synchronized Random Access Design for High Doppler Conditions," 3GPP TSG RAN WG1 #47, R1-063214, Riga, Lativia, Nov. 6-10, 2006, 7 pages.

Panasonic, NTT DoCoMo, "Zadoff-Chu sequence allocation on RACH for complexity reduction," TSG-RAN WG1, Discussion and Decision, Agenda item: 6.5.1, R1-070189, Sorrento, Italy, Jan. 15-19, 2007, 4 pages.

(56) References Cited

OTHER PUBLICATIONS

LG Electronics, "Ways to Mitigate Frequency Offset with CAZAC Cyclic Shift," 3GPP TSG RAN WG1 #47bis, Discussion and Decision, Agenda item: 6.5.1, R1-070227, Sorrento, Italy, Jan. 15-19, 2007, 8 pages.

Nokia, "Restricted sets of RACH preamble signatures for environments with high Doppler shifts," 3GPP TSG RAN WG1 #47bis, Discussion and Decision, Agenda item: 6.5.1, R1-070377, Sorrento, Italy, Jan. 15-19, 2007, 6 pages.

Huawei, "Specification of restricted set of cyclic shifts of root Zadoff-Chu sequences," Discussion and Decision, TSG RAN WG1 meeting #48bis, Agenda Item: 7.4 RACH, R1-071408, Mar. 26-30, 2007, 4 pages.

Texas Instruments, "Outstanding issues in Random Access Preamble Design for E-UTRA," Discussion, decision, 3GPP TSG RAN WG1 #48bis, R1-071471, Agenda Item: 7.4, Mar. 26-30, 2007, pp. 1-6.

Panasonic, "Realization of cyclic shift restriction for RACH," 3GPP TSG RAN WG1 Meeting #48bis, R1-071518, St. Julians, Malta, Mar. 26-30, 2007, 5 pages.

Panasonic, "RACH sequence indication method on BCH," Discussion and Decision, 3GPP TSG RAN WG1 Meeting #48bis, R1-071519, Mar. 26-30, 2007, pp. 1-3.

Samsung, "Using Restricted Preamble Set for RACH in High Mobility Environments," 3GPP TSG RAN WG1 #48bis, Discussion and Decision, Agenda item: 7.4, R1-071560, St. Julians, Malta, Mar. 26-30, 2007, 9 pages.

Nokia, et al., "On construction and signaling of RACH preambles," Discussion and decision, 3GPP TSG RAN WG1 #48bis, R1-071661, Mar. 26-30, 2007, 2 pages.

LG Electronics Inc., "Design for restricted set of cyclic shifts," Discussion & Decision, 3GPP TSG RAN WG1 #48bis, R1-071697, Agenda Item: 7.4, Mar. 26-30, 2007, pp. 1-3.

Huawei, "Multiple values of cyclic shift increment Ncs," Discussion and decision, TSG RAN WG1 Meeting #49, Agenda Item: 7.4, R1-072325, May 7011, 2007, 5 pages.

LG Electronics, "Preamble Allocation for Non-Synchronized RACH," 3GPP TSG RAN WG1 #49, Discussion and Decision, Agenda item: 7.4, R1-072330, Kobe, Japan, May 7-11, 2007, 3 pages.

Samsung, "Procedure and Algorithm to Determine the Cyclic Shift Restricted Sets and Associated Signaling for RACH," 3GPP TSG RAN WG1 #49bis, Discussion and Decision, Agenda item: 5.4, R1-073113, Orlando, Florida, Jun. 25-29, 2007, 4 pages.

Texas Instruments, "Random Access Preamble L1 Parameters in E-UTRA," 3GPP TSG RAN WG1 #50, Discussion and Decision, Agenda item: 7.2.9, R1-073435, Athens, Greece, Aug. 20-24, 2007, 7 pages.

Samsung, "Determination fo the Cyclic Shift Amount, Ncs," 3GPP TSG RAN WG1 #50, Discussion and Decision, Agenda item: 7.2.9, R1-073553, Athens, Greece, Aug. 20-24, 2007, 3 pages.

Motorola, "Random Access E-mail Reflector Summary," 3GPP TSG RAN WG1 #50bis, Discussion and Decision, Agenda item: 6.2.7, R1-074026, Shanghai, China, Oct. 8-12, 2007, 3 pages.

Texas Instruments, LG Electronics, "Cyclic Shift Values for E-UTRA PRACH," 3GPP TSG RAN WG1 #50bis, Discussion and Decision, Agenda item: 6.2.7, R1-074147, Shanghai, China, Oct. 8-12, 2007, 6 pages.

* cited by examiner

RANDOM ACCESS PREAMBLE DESIGN

CROSS-REFERENCE TO RELATED APPLICATIONS

This application is a continuation of U.S. patent application Ser. No. 16/378,096, filed on Apr. 8, 2019, which is a continuation of U.S. patent application Ser. No. 14/557,088, filed on Dec. 1, 2014, now U.S. Pat. No. 10,285,092, which is a continuation of U.S. patent application Ser. No. 14/045,554, filed on Oct. 3, 2013, now U.S. Pat. No. 8,913,696. The U.S. patent application Ser. No. 14/045,554 is a continuation of U.S. patent application Ser. No. 12/605,616, filed on Oct. 26, 2009, now U.S. Pat. No. 8,599,974. The U.S. patent application Ser. No. 12/605,616 is a continuation of International Patent Application No. PCT/CN2008/070768, filed on Apr. 22, 2008, which claims priority to Chinese Patent Application No. 200710074200.1, filed on Apr. 30, 2007. All of the afore-mentioned patent applications are hereby incorporated by reference in their entireties.

TECHNICAL FIELD

The disclosure relates to the technology of mobile communication, and more particularly, to the design of a Random Access Preamble (RAP).

BACKGROUND

In a mobile communication system, a Random Access Preamble is normally transmitted to a base station by a mobile terminal to initiate the random access procedure and to enable synchronization of the mobile terminal with the base station.

There are 64 preambles in each cell in the document of "3GPP TS 36.211 v1.0.0-Physical Channels and Modulation" which was published in March 2007. When initiating a random access procedure, a mobile terminal transmits one of the 64 preambles. A message is transmitted to a base station by the mobile terminal selecting a particular preamble.

Before transmitting the preamble, a mobile terminal must synchronize to the carrier frequency and the frame timing of a base station to become downlink synchronized. Although the mobile terminal is downlink synchronized, there is uncertainty when a signal transmitted by the mobile terminal arrives at the base station. This is because a mobile terminal far away from the base station will receive downlink signals with a larger delay than a mobile terminal close to the base station, and the transmitted signals in uplink will take longer time to propagate to the base station for a mobile terminal which is far away from the base station compared to the signals from a mobile terminal close to the base station. The uncertainty in round trip time causes interferences between uplink signals transmitted by different mobile terminals unless uplink synchronization is performed before data transmission in uplink.

The transmission of any of the RAPs allows a base station to estimate the time of arrival of an uplink signal. The base station can then, based on the time of arrival estimate, transmit a time advance command to a mobile terminal to ensure uplink synchronization. Hence, once a preamble is transmitted by a mobile terminal, the base station may detect which preamble has been transmitted and estimate the time of arrival.

To obtain good detection properties of the preambles, or to accurately estimate the time of arrival of the uplink signal, the set of preambles should be designed to have good autocorrelation and cross-correlation properties.

The set of RAPs in Evolved UTRA (E-UTRA) is defined from one or several root sequences. A subset of the preambles $x_{u,v}(k)$ is generated from the $u^{th}$ order root Zadoff-Chu (ZC) sequence $x_u(k)$ by cyclic shifts of a plurality of the shift increments $N_{CS}$. Specifically, $x_{u,v}(k)$ may be generated according to the equation below:

$$x_{u,v}(k) = x_{u,v}((k+vN_{CS}) \bmod N_{ZC}), \qquad (1)$$

where $v$ is an integer, and $N_{ZC}$ is the length of the ZC sequence defined by:

$$x_u(k) = W^{uk(k+1)/2}, k=0,1,\ldots,N_{ZC}-1, W=e^{-j2\pi/N_{ZC}}, j=\sqrt{-1} \qquad (2)$$

The number of preambles that may be generated from a single root sequence is $N_{pre} = \lfloor N_{ZC}/N_{CS} \rfloor$, where $\lfloor n \rfloor$ denotes the largest integer not greater than n. If $N_{pre} < 64$, then several preamble subsets generated from different root sequences are required to obtain 64 preambles in a cell. The cross-correlation between different root sequences is small but still larger than the cross-correlation between sequences generated by a single root sequence. Thus it is beneficial for the detection performance to have $N_{pre}=64$ if $N_{pre}$ could not be set greater.

The number of ZC sequences contained in each set of ZC sequences with length of $N_{ZC}$ is $N_{ZC}-1$. If the number of root sequences for obtaining the 64 preambles of a cell is $N_r$, $N_r = \lceil 64/Npre \rceil$, where $\lceil n \rceil$ denotes the minimal integer not smaller than n, then the number of disjoint sets is $N_D = \lfloor (N_{ZC}-1)/N_r \rfloor$. Different cells in a network should make use of preambles obtained from disjoint sets of root sequences, so that the base station knows whether a transmitted preamble is intended for a certain cell or not. The larger the number of root sequences $N_r$ that is needed for obtaining 64 preambles in a cell, the smaller is the number of disjoint sets of RAPs $N_D$. Thus, from network planning perspective, it is desirable to have $N_{pre}=64$, and if that is not possible, to have as high value as possible of $N_{pre}$.

A subset of preambles generated with equation (1) is a set of so-called Zero-Correlation Zone (ZCZ) sequences. The definition for a set of ZCZ sequences is as follows: a set of M sequences $\{d_v(k)\}$, $v=0, 1, \ldots, M-1$, $k=0, 1, \ldots, N-1$, of length N, is said to be a set of ZCZ sequences, if all the sequences in the set satisfy the following autocorrelation and cross-correlation properties:

The periodic autocorrelation function $\Sigma_{k=0}^{N-1} d_v(k) d_v^*((k+p) \bmod N)$ is zero for all p such that $0 < |p| \leq T$, and the periodic cross-correlation function $\Sigma_{k=0}^{N-1} d_v(k) d_w^*((k+p) \bmod N)$ is zero for all p such that $|p| \leq T$ (including p=0), where T is the length of the ZCZ.

A ZC sequence has ideal periodic autocorrelation, for example, $\rho_{k=0}^{N-1} x_u(k) x_u^*((k+p) \bmod N)$ is zero for all nonzero p. Thus the set of preambles defined as cyclic shifts of the root sequence according to equation (1) is a set of ZCZ sequences, where the ZCZ length is $T=N_{CS}-1$.

Based on $N_{pre} = \lfloor N_{ZC}/N_{CS} \rfloor$, $N_{CS}$ should be as small as possible in order to make $N_{pre}$ be as great as possible. But the value of $N_{CS}$ should not be too small. In a base station a bank of correlators are used when receiving RAPs, so that there is one correlator for each preamble. Each correlator outputs time of arrival from 0 to $T \times T_s = (N_{CS}-1) \times T_s$, where $T_s$ is the symbol period of the sequence. The ZCZ property of the set of preambles implies that the correlator for any preamble will give a zero output if any other preamble is transmitted as long as the sum of the round trip time and delay spread in the cell is less than or equal to the product of the length of ZCZ and $T_s$ (i.e., $T \times T_s$). The maximum round trip time $T_r$ in a cell is given by the cell radius R: $T_r=2R/c$, where c is the speed of light. Thus, the minimum value of the length of ZCZ and the minimum value of $N_{CS}$ length for a certain cell increase with the cell radius. Therefore, the value of the selected $N_{CS}$ should be large enough to ensure that the conditions mentioned above are satisfied.

Since the cell radius to be supported in E-UTRA is from 1 km to 100 km, and since $N_{CS}$ should be as small as possible for any given cell, there is a need for multiple values of $N_{CS}$. The value of an $N_{CS}$ in a cell is broadcast to a mobile terminal by a base station. Of course, the base station may broadcast the length of ZCZ to the mobile terminal, so that the mobile terminal knows how to generate preambles. It is desirable to have as small amount of signaling as possible on the broadcast channel to save overload. Therefore, to achieve low signaling overload, there should be a limited predefined set of values of $N_{CS}$ or a set of lengths of ZCZ.

Currently, it is proposed in the 3GPP Tdoc "R1-071661-On construction and signaling of RACH preambles" disclosed in March 2007 that, the cyclic shift increment value $N_{CS}$ in the cell was proposed to be signalled to the UE but there was no restriction on the values of the cyclic shift increment, which would then give a substantial amount of signalling. An alternative proposal is given in the 3GPP Tdoc "R1-071471—Outstanding issues in random access preamble design for E-UTRA" disclosed in March 2007, which is to have ii values of $N_{CS}$ without specification how to select the values. Of course, it is not described in these documents how to select the lengths of ZCZ either. Currently there is no feasible scheme for selecting an appropriate limited set of ZCZ lengths, in order to ensure a small and limited signaling overload.

SUMMARY

According to a first aspect of the disclosure, a method of facilitating a user equipment (UE) communicating with a base station (BS) via a cell of a mobile communications system is provided. The UE selects a random access preamble (RAP) from a set of RAPs, and transmits the RAP to the BS. The BS receives the RAP, and estimates a time of arrival of the RAP. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by: $x_{u,v}(k)=x_{u,v}((k+vN_{CS}) \bmod N_{ZC})$, where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by: $x_u(k)=W^{uk(k+1)/2}$, $K=0, 1, \ldots, N_{ZC}-1$, $W=e^{xj2\pi/N_{ZC}}$, $j=\sqrt{-1}$.

According to a second aspect of the disclosure, a mobile communications system is provided. The system includes a UE in communication with a BS via a cell of the system. The UE is configured to select a RAP from a set of RAPs, and transmit the RAP to the BS. The BS is configured to receive the RAP, and estimate a time of arrival of the RAP. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by:

$$x_{u,v}(k)=x_{u,v}((k+vN_{CS}) \bmod N_{ZC}),$$

where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}-1, W=e^{-j2\pi/N_{ZC}} j=\sqrt{-1}.$$

According to a third aspect of the disclosure, a UE is provided. The UE includes a memory retaining instructions and a processor coupled to the memory. The processor is configured to execute the instructions retained in the memory. The instructions relate to the UE selecting an RAP from a set of RAPs, and the UE transmitting the RAP to a BS. The UE is capable of communicating with the BS via a cell of a mobile communications system. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by:

$$x_{u,v}(k)=x_{u,v}((k+vN_{CS}) \bmod N_{ZC}),$$

where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}-1, W=e^{-j2\pi/N_{ZC}} j=\sqrt{-1}.$$

According to a fourth aspect of the disclosure, a BS is provided. The BS includes a memory retaining instructions and a processor coupled to the memory. The processor is configured to execute the instructions retained in the memory. The instructions relate to the BS receiving an RAP and estimating a time of arrival of the RAP. The RAP is selected from a set of RAPs. The BS is capable of communicating with a UE via a cell of a mobile communications system. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by: $x_{u,v}(k)=x_{u,v}((k+vN_{CS}) \bmod N_{ZC})$, where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}-1, W=e^{-j2\pi/N_{ZC}} j=\sqrt{-1}.$$

DETAILED DESCRIPTION OF ILLUSTRATIVE EMBODIMENTS

Figure 1:
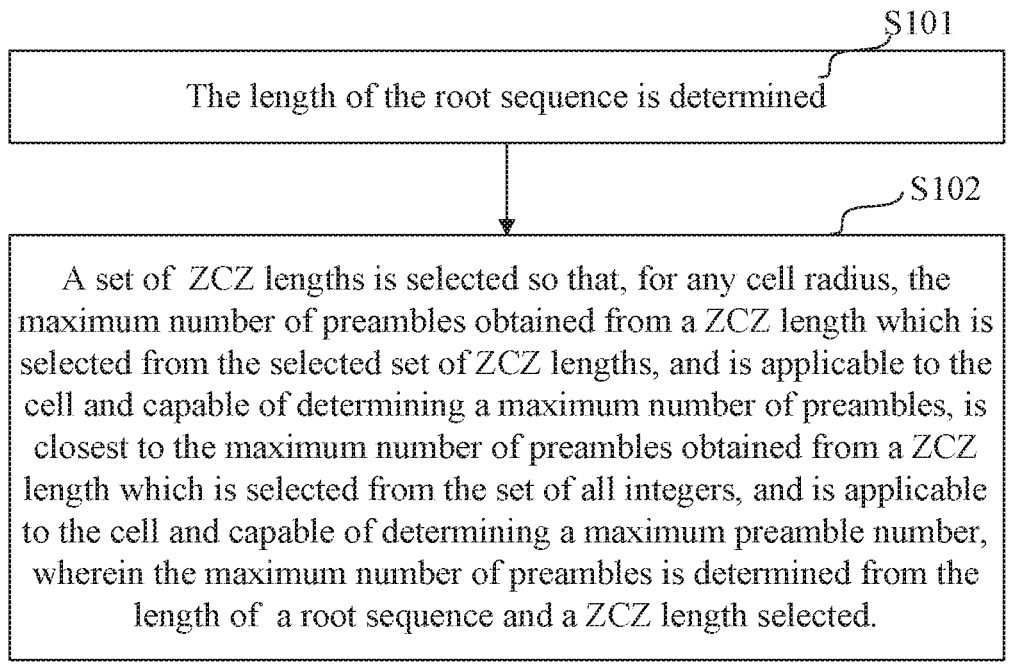
FIG. 1 is a flow chart illustrating an method embodiment of the disclosure.

The general solution of an embodiment of the disclosure is described first, incorporating FIG. 1. As illustrated in FIG. 1, the embodiment includes:

Step 101: The length of the root sequence is determined.

Step 102: A set of ZCZ lengths is selected so that, for any cell radius, the maximum number of preambles determined from a ZCZ length which is selected from the selected set of ZCZ lengths, and is applicable to the cell and capable of determining a maximum number of preambles, is closest to the maximum number of preambles obtained from a ZCZ length which is selected from the set of all integers, and is applicable to the cell and capable of determining a maximum number of preambles, wherein the maximum number of preambles is determined from the length of the root sequence and a ZCZ length selected.

In an embodiment of the disclosure, it should be ensured that the product of a ZCZ length and the symbol period of the sequence is greater than the sum of the round trip time and the delay spread of a cell, i.e., $T \times T_s > T_r + T_d$, in which, T is the length of ZCZ, $T_s$ is the symbol period, $T_r$ is the round trip time, and $T_d$ is the delay spread.

Since the maximum round trip time $T_r$ in a cell is determined by the cell radius R, i.e., $T_r = 2R/c$, where c is the speed of light, $T \times T_s > T_r + T_d$ may be rewritten as $T \times T_s > 2R/c + T_d$.

Furthermore, since $T = N_{CS} - 1$, $T \times T_s > 2R/c + T_d$ may be rewritten as $(N_{CS} - 1) \times T_s > 2R/c + T_d$. Therefore, $N_{CS} > 1 + (2R/c + T_d)/T_s$.

Additionally, since $N_{pre} = \lfloor N_{ZC}/N_{CS} \rfloor$, $N_{pre} < \lfloor N_{ZC}/(1 + (2R/c + T_d)/T_s) \rfloor$. Thus, $N_{pre}$ may be a function of the cell radius R. Of course, the cell radius may also be varying; and the value of $N_{pre}$ decreases as the value of $N_{CS}$ increases.

In an embodiment of the disclosure, a limited set of $N_{CS}$ values is constructed, i.e., for a certain cell radius, the $N_{pre}$ corresponding to the minimum $N_{CS}$ value which is selected from the limited set and is applicable to the cell, is closest to the $N_{pre}$ corresponding to the minimum $N_{CS}$ value which is selected from the set of all integers and is applicable to the cell. Furthermore, a maximum relative difference may be constructed from $N_{pre}$. This maximum relative difference is between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell. If the finally determined or selected limited set is such a set that the maximum relative difference between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell, is minimized in a cell of any radius, this limited set is a required one.

Figure 2:
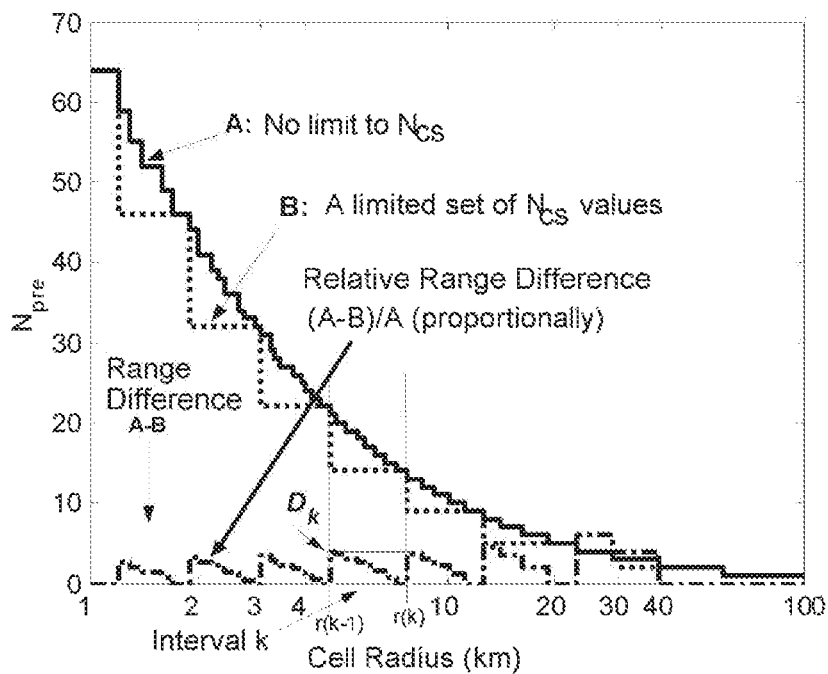
FIG. 2 is a diagram illustrating the relationship between the maximum number of preambles and the cell radius according to an embodiment of the disclosure.

As illustrated in FIG. 2, curve A indicates that for any one cell radius, an integer from the set of all integers may be selected as $N_{CS}$ of the cell, wherein a maximum number of preamble sequences may be generated based on the integer selected, and the generated preamble sequences are applicable to the cell. Curve B indicates a set of $N_{CS}$ including a limited number of $N_{CS}$. When the limited number of $N_{CS}$ is applied in cells of all radii, within a certain interval of cell radii, a same $N_{CS}$ will be used for all cell radii. Thus, the $N_{CS}$ should be determined according to the maximum cell radius in the interval of cell radii. Compared with A, the preamble number generated according to B decreases.

Under these conditions, if the selected limited set ensures that the maximum relative difference between the $N_{pre}(R)$ determined from a $N_{CS}$ value selected from any integer and the $N_{pre}(R)$ determined from a $N_{CS}$ value selected from the limited set is minimized, and it is assumed that the $N_{pre}(R)$ determined from a $N_{CS}$ value selected from any integer is A(R) and the $N_{pre}(R)$ determined from a $N_{CS}$ value selected from the limited set is B(R), and then A(R) and B(R) are respectively illustrated in FIG. 2.

As seen from FIG. 2, there is a small deviation between A(R) and B(R). For a certain cell radius R, the deviation of B(R) from A(R) for some cell radius R may increase the number of required root sequences for that cell radius R. The increase of the number of root sequences becomes very important for large cell radii where $N_{pre}$ is small. For example, if A(R)=3 and B(R)=2, the number of root sequences increases significantly, from $\lceil 64/3 \rceil = 22$ to $\lceil 64/2 \rceil = 32$. An appropriate measure of the deviation of B from A should therefore weigh the difference A−B with higher weight for small $N_{pre}$, e.g. by considering the maximum relative difference between A(R) and B(R), i.e., [A(R)−B(R)]/A(R). We will adopt the maximum relative difference between A(R) and B(R) over all cell radii as the measurement of the deviation of B(R) from A(R), and find a set of $N_{CS}$ values that minimizes this measurement. This set may consist of one $N_{CS} = 0$ and K+1 non-zero $N_{CS}$ values. The total number of $N_{CS}$ values in the set is K+2.

For example, in a relatively small cell, it would be possible to generate 64 ZCZ preambles from a single root sequence if $N_{CS} = \lfloor N_{ZC}/64 \rfloor$. This value is the smallest value in the set $N_{CS}(k)$.

The maximum value, $N_{CS}(K)$, is the one that allows for having 2 ZCZ sequences from a set single root sequence, so it is $\lfloor N_{ZC}/2 \rfloor$.

For the largest cells there is only one RAP generated from each root sequence. Therefore, $N_{CS}(K+1) = 0$.

The maximum relative difference between A(R) and B(R), i.e., [A(R)−B(R)]/A(R), is non-increasing with radius R within the interval of [(r(k−1), r(k)] and the interval being k, as illustrated in FIG. 2. In FIG. 2, r(k) denotes the kth cell radius arranged orderly from small ones to large ones. The reason is that B(R) is constant in the interval, whereas A is inversely proportional to the smallest possible $N_{CS}$ for given R. This value of $N_{CS}$ increases with the round trip time and hence with R.

If it is assumed that the maximum number of preamble sequences of the set A(R) is $N_{pre}(k-1)-1$ in the cell radius interval of [(r(k−1), r(k)], the maximum number of preamble sequences of the set B(R) generated in this interval associate with the cell radius r(k), i.e., the maximum number of preamble sequences is $N_{pre}(k)$. The maximum relative difference $D_k$ in the interval k may be obtained from the following equation:

$$D_k = \frac{N_{pre}(k-1) - 1 - N_{pre}(k)}{N_{pre}(k-1) - 1}$$

If $D_k$ and $N_{pre}(k-1)$ are given, $N_{pre}(k)$ may be obtained by rearranging the above equation, i.e.:

$$N_{pre}(k) = (1 - D_k)(N_{pre}(k-1) - 1)$$

The maximum relative difference $D_{max}$ for all cell radii may be given by $$D_{max} = \max\{D_k\}_{k=1}^{K}.$$

For $N_{pre}(k)$, we will first allow $N_{pre}(k)$ to be a real number, and then round the result to the nearest integer. Additionally, $N_{pre}(0)$ and $N_{pre}(K)$ are fixed.

Then $D_{max}$ is minimized if all $D_k$ are equal, i.e. $D_k = D$, $k = 1, 2, \ldots, K$, as will be proved in the following.

A set of values $\{N_{pre}^{(1)}(k)\}_{k=0}^{K}$ is constructed with the constraint that for $k=0$ and $k=K$, so that $D_k^{(1)}$, $k = 1, 2, \ldots, K$. For this set, $D_{max} = D$.

Next, another set of values $\{N_{pre}^{(1)}(k)\}_{k=0}^{K}$ is constructed with the constraint that $N_{pre}^{(2)}(k) = N_{pre}(k)$ for $k=0$ and $k=K$, so that $D_{max} < D$, i.e. $D_k^{(2)} < D_k^{(1)}$, $k = 1, 2, \ldots, K$.

When $k=1$, since $D_k^{(2)} < D_k^{(1)}$ and $N_{pre}^{(2)}(0) = N_{pre}^{(1)}(0)$, $N_{pre}^{(2)}(1) > N_{pre}^{(1)}(1)$ is obtained according to $N_{pre}(k) = (1 - D_k)(N_{pre}(k-1) - 1)$.

When $k=2$, since $D_2^{(2)} < D_2^{(1)}$ and $N_{pre}^{(2)}(1) > N_{pre}^{(1)}(1)$, $N_{pre}^{(2)}(2) > N_{pre}^{(1)}(2)$ is obtained according to $N_{pre}(k) = (1 - D_k)(N_{pre}(k-1) - 1)$.

Similarly, for all k, since $N_{pre}^{(2)}(K) = N_{pre}^{(1)}(K) = N_{pre}(K)$, $N_{pre}^{(2)}(k) > N_{pre}^{(1)}(k)$ is impossible.

Thus, it is impossible to construct a set of values $N_{pre}(k)$ such that $D_{max} < D$, which proves that $D_{max}$ is minimized if all $D_k$ are equal, i.e. $D_k = D$, $k = 1, 2, \ldots, K$.

In this way, the set of values $\{N_{pre}(k)\}_{k=0}^{K}$ which minimizes $D_{max}$ may be found.

Replacing $D_k$ by D in $N_{pre}(k) = (1 - D_k)(N_{pre}(k-1) - 1)$ and rearranging the equation, a linear difference equation is obtained as follows:

$$N_{pre}(k) - aN_{pre}(k-1) = -a, \text{ wherein } a = (1-D).$$

By recursion, it is obtained from the above equation:

$$N_{pre}(k) = N_{pre}(0)a^k + \frac{a}{1-a}(a^k - 1) \quad (3)$$

From the above equation and the boundary conditions $N_{pre}(0)$ and $N_{pre}(K)$, a may be determined numerically.

For example, the maximum number of preambles generated from one root sequence is 64, i.e., $N_{pre}(0) = 64$. The minimum number of preamble obtained by cyclic shift is 2, for example, $N_{pre}(14) = 2$. Thus, $a = 0.856$ may be obtained from these two parameters, and all $N_{pre}(k)$, $k = 1, 2, \ldots$ may further be obtained.

The maximum relative difference is minimized through an approximate minimization by a sub-optimal algorithm, i.e., by minimizing the maximum relative difference for fictive real-valued maximum number of ZCZ RAPs, and the maximum number of the ZCZ RAPs is thereafter quantized. The method is specified below.

By first rounding the fictive real-valued $N_{pre}(k)$ in $$N_{pre}(k) = N_{pre}(0)a^k + \frac{a}{1-a}(a^k - 1),$$

the following equation is obtained:

$$N_{CS}(k) = \lfloor N_{ZC}/[N_{pre}(0) \times a^k + a/(1-a) \times (a^k - 1)] \rfloor \quad (4)$$

where IA denotes the maximum integer not greater than x, $N_{ZC}$ is the length of the root sequence, $N_{pre}(0)$ denotes the maximum number of preambles generated from the root sequence.

Still taking the above example as an example, if $N_{pre}(0) = 64$ and $N_{pre}(14) = 2$, $a = 0.856$ is obtained based on equation (3). Next, when $N_{ZC} = 839$, $N_{cs}(k)$, $k = 0, 1, 2, \ldots, 14$ obtained based on equation (4) is illustrated in table 1:

TABLE 1

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 |

If only one preamble sequence is obtained for a very large cell, which is the sequence itself, then $N_{CS} = 0$. Adding this value into the above table, table 2 is obtained:

TABLE 2

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 |
| 15 | 0 |

Figure 3:
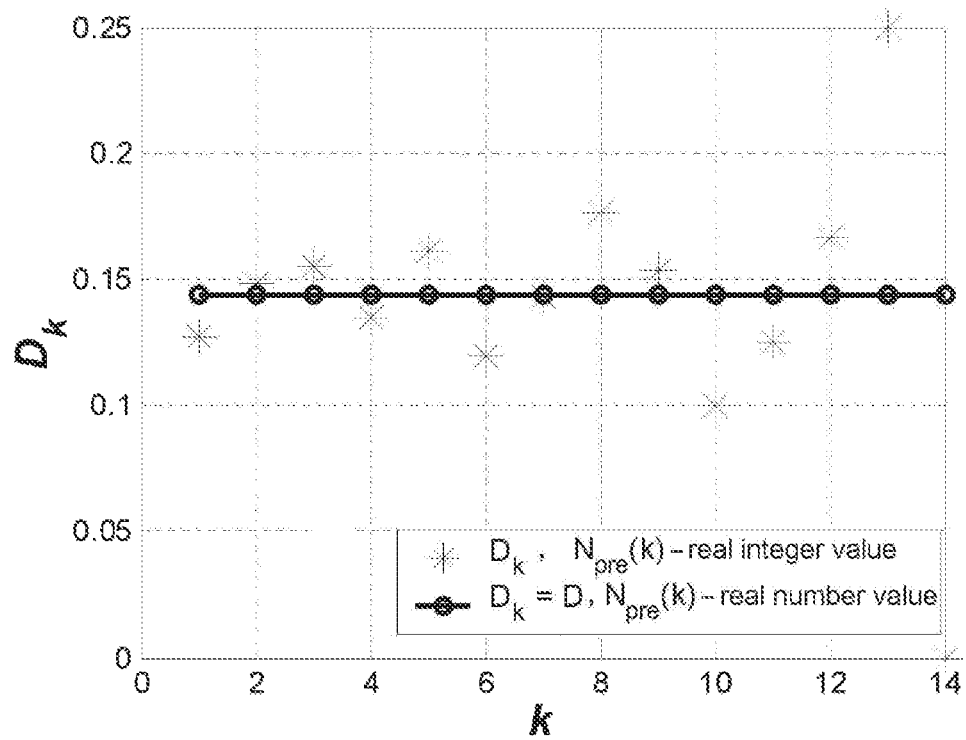
FIG. 3 is a diagram illustrating the value of maximum relative difference in the cell radius interval k according to an embodiment of the disclosure.

Finally, the true integer value of $N_{pre}(k)$ is obtained from $N_{pre}(k) = \lfloor N_{ZC}/N_{CS}(k) \rfloor$ that for some values of k $N_{ZC}/N_{CS}(k)$ are greater than the rounded values $N_{pre}(k)$. As illustrated in FIG. 3, when $K=14$, the value of $D_k$ obtained from the real number value of $N_{pre}(k)$ is $D=0.144$. It can be seen from FIG. 3 that the true integer values of $N_{pre}(k)$ will cause $D_k$ to deviate from D. But the deviation is still very small for all cells except the two largest cells. Thus, the selected limited set of values of $N_{CS}$ is applicable.

It should be noted that if the limited set of values of $N_{CS}$ is determined, the limited set of lengths of ZCZ may also be determined, for instance, according to $T = N_{CS} - 1$.

Figure 4:
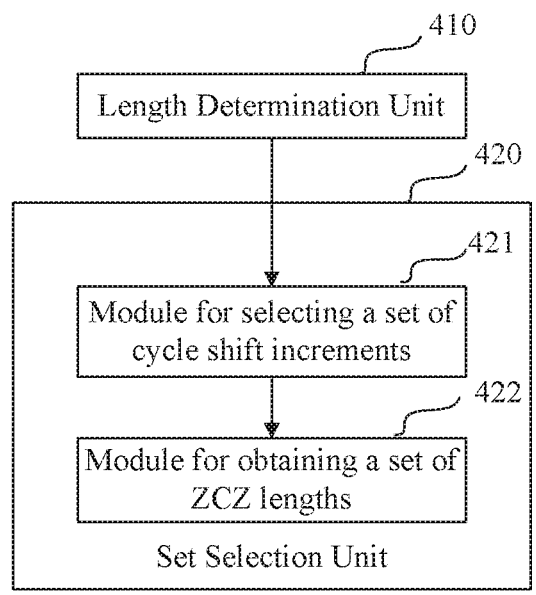
FIG. 4 is a block diagram of the base station according to an embodiment of the disclosure.

Correspondingly, the disclosure provides an embodiment of an apparatus of determining a set of ZCZ lengths. As illustrated in FIG. 4, the apparatus includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined by the length of the root sequence and a ZCZ length selected.

The set selection unit 420 may include: a module 421 adapted for the selection of a set of cyclic shift increments, wherein, the module 421 is configured to select such a set of cyclic shift increments that, for any cell radius, the maximum number of preambles determined from a cyclic shift increment which is selected from the selected set of cyclic shift increments, and is applicable to the cell, is closest to the maximum number of preambles determined from a cyclic shift increment which is selected from the set of all integers and is applicable to the cell, wherein the maximum number of preambles is determined by the root sequence length and a cyclic shift increment selected; and a module 422 adapted to obtain a set of ZCZ lengths, wherein the module is configured to obtain the set of ZCZ lengths according to the selected set of cyclic shift increments.

In above apparatus embodiment, the cyclic shift increment selected from the selected set of cyclic shift increments is the minimum cyclic shift increment in the selected set of cyclic shift increments; and the cyclic shift increment selected from the set of all integers is the minimum cyclic shift increment in the set of all integers.

The disclosure provides an embodiment of a base station, as illustrated in FIG. 4, which includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

Figure 5:
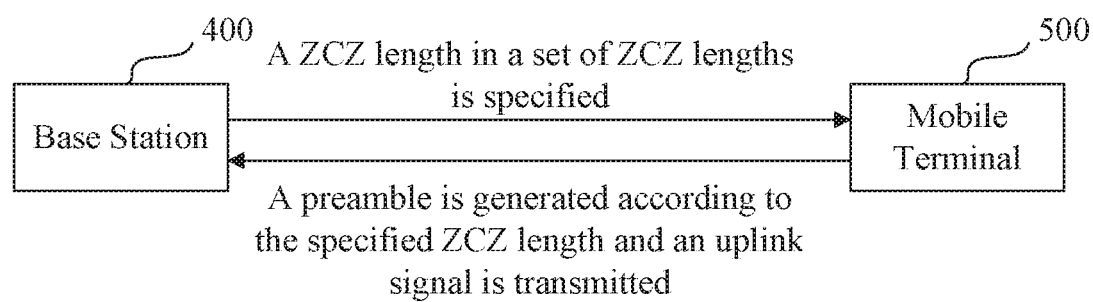
FIG. 5 is a diagram illustrating the mobile communication system according to an embodiment of the disclosure.

The disclosure further provides an embodiment of a mobile communication system, as illustrated in FIG. 5. The system comprises a base station 400 and a mobile terminal 500. The base station 400 is configured to interact with the mobile terminal 500, and to specify a ZCZ length from a set of ZCZ lengths for the mobile terminal 500; the mobile terminal 500 is configured to generate a preamble according to the ZCZ length specified by the base station 400, and to transmit an uplink signal to the base station 400 using the preamble; the set of ZCZ lengths is such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

In above embodiment of the mobile communication system, the cyclic shift increment selected from the selected set of cyclic shift increments is the minimum cyclic shift increment applicable to the cell in the selected set of cyclic shift increments, the cyclic shift increment selected from the set of all integers is the minimum cyclic shift increment applicable to the cell in the set of all integers.

In general, in embodiments of the disclosure, the selected limited set of $N_{CS}$ values should be such a set that, in a plurality of intervals of cell radii, the maximum relative difference between the maximum number of the ZCZ RAPs determined from the minimum $N_{CS}$ value of the limited set, which is applicable to the plurality of cells, and the maximum number of the ZCZ RAPs determined from a plurality of $N_{CS}$ values of a set of integers which are applicable to the plurality of cells is minimized. Furthermore, a limited set of ZCZ lengths may be selected. Of course, in a plurality of intervals of cell radii, the maximum relative difference between the maximum number of the ZCZ RAPs determined from the minimum ZCZ length of the limited set of ZCZ lengths, which is applicable to the plurality of cells, and the maximum number of the ZCZ RAPs determined from a plurality of ZCZ lengths of the set of all integers which are applicable to the plurality of cells is minimized.

What are described above are only preferred embodiments of the disclosure. It should be noted that, for a person skilled in the art, variations and improvements may be made without deviating from the principle of the disclosure. Those variations and improvements are all regarded to be within the scope of the disclosure.

What is claimed is:

1. A communication method, comprising:
notifying, by a base station in a wireless communication network, a terminal of cyclic shift increment configuration information indicating a cyclic shift increment value $N_{CS}$ ($N_{CS}$ value), the $N_{CS}$ value belonging to a set of cyclic shift increments including non-zero cyclic shift increments $N_{CS}(k)$; and
receiving, by the base station from the terminal, a random access preamble related to the $N_{CS}$ value indicated by the cyclic shift increment configuration information; and
wherein $N_{CS}(k)$ satisfies following formula:

$N_{CS}(k) = \lfloor N_{ZC}/[N_{pre}(0) \times a^k + a/(1-a) \times (a^k-1)] \rfloor, k = 0,1,2 \ldots K;$ wherein $\lfloor N_{ZC}/[N_{pre}(0) \times a^k + a/(1-a) \times (a^k-1)] \rfloor$ denotes a maximum integer not greater than $N_{ZC}/[N_{pre}(0) \times a^k + a/(1-a) \times (a^k-1)]$, $[N_{pre}(0) \times a^k + a/(1-a) \times (a^k-1)]$ denotes a nearest integer to $N_{pre}(0) \times a^k + a/(1-a) \times (a^k-1)$, $N_{pre}(0) = 64$, $N_{zc}$ denotes a length of a Zadoff-Chu sequence corresponding to the random access preamble, and $K=14$; and
wherein $a=0.856$ or a satisfies following formula:

$$2 = 64 \times a^{14} + \frac{a}{1-a}(a^{14} - 1).$$

2. The communication method according to claim 1, wherein the set of cyclic shift increments further includes a $N_{CS}$ value of 0, and the $N_{CS}$ value of 0 in the set of cyclic shift increments indicates that one preamble sequence is generated from one root sequence.

3. The communication method according to claim 1, wherein the random access preamble belongs to a set of random access preambles.

4. The communication method according to claim 3, wherein the set of random access preambles is derived from at least one Zadoff-Chu sequence.

5. The communication method according to claim 4, wherein the at least one Zadoff-Chu sequence is used in generation of a sequence $x_{u,v}(k)$ for the set of random access preambles, and the sequence $x_{u,v}(k)$ is given by:

$x_{u,v}(k)=x_u((k+vN_{CS})\bmod N_{ZC})$, where u and v are integers, $N_{ZC}$ is a length of the at least one Zadoff-Chu sequence, $x_u(k)=e^{-j\pi uk(k+1)/N_{ZC}}$, $k=0, 1, \ldots, N_{ZC}-1$, and $j=\sqrt{-1}$.

6. The communication method according to claim 4, wherein random access preambles derived from a same Zadoff-Chu sequence in the set of random access preambles have zero correlation zones of a length $N_{CS}-1$.

7. The communication method according to claim 3, wherein the set of random access preambles comprises 64 random access preambles.

8. A base station operable to communicate in a wireless communications network, the base station comprising:
 a processor; and
 a non-transitory computer readable storage medium storing programming for execution by the processor coupled to the storage medium, the programming including instructions that direct the base station to:
 notify a terminal of cyclic shift increment configuration information indicating a cyclic shift increment value $N_{CS}$ ($N_{CS}$ value), the $N_{CS}$ value belonging to a set of cyclic shift increments including non-zero cyclic shift increments $N_{CS}(k)$; and
 receive, from the terminal, a random access preamble related to the $N_{cs}$ value indicated by the cyclic shift increment configuration information; and
 wherein $N_{CS}(k)$ satisfies following formula:

$$N_{CS}(k)=\lfloor N_{ZC}/[N_{pre}(0)\times a^k+a/(1-a)\times(a^k-1)]\rfloor, k=0,1,2\ldots K;$$

wherein $\lfloor N_{ZC}[N_{pre}/(0)\times a^k+a/(1-a)\times(a^k-1)]\rfloor$ denotes a maximum integer not greater than $N_{ZC}/[N_{pre}(0)\times a^k+a/(1-a)\times(a^k-1)]$, $[N_{pre}(0)\times a^k+a/(1-a)\times(a^k-1)]$ denotes a nearest integer to $N_{pre}(0)\times a^k+a/(1-a)\times(a^k-1)$, $N_{pre}(0)=64$, $N_{zc}$ denotes a length of a Zadoff-Chu sequence corresponding to the random access preamble, and K=14; and wherein a=0.856 or a satisfies following formula:

$$2 = 64 \times a^{14} + \frac{a}{1-a}(a^{14}-1).$$

9. The base station according to claim 8, wherein the set of cyclic shift increments further includes a $N_{CS}$ value of 0, and the $N_{CS}$ value of 0 in the set of cyclic shift increments indicates that one preamble sequence is generated from one root sequence.

10. The base station according to claim 8, wherein the random access preamble belongs to a set of random access preambles.

11. The base station according to claim 10, wherein the set of random access preambles is derived from at least one Zadoff-Chu sequence.

12. The base station according to claim 11, wherein the at least one Zadoff-Chu sequence is used in generation of a sequence $x_{u,v}(k)$ for the set of random access preambles, and the sequence $x_{u,v}(k)$ is given by:

$x_{u,v}(k)=x_u((k+vN_{CS})\bmod N_{ZC})$, where u and v are integers, $N_{ZC}$ is a length of the at least one Zadoff-Chu sequence, $x_u(k)=e^{-j\pi uk(k+1)/N_{ZC}}$, $k=0, 1, \ldots, N_{ZC}-1$, and $j=\sqrt{-1}$.

13. The base station according to claim 11, wherein random access preambles derived from a same Zadoff-Chu sequence in the set of random access preambles have zero correlation zones of a length $N_{CS}-1$.

14. The base station according to claim 10, wherein the set of random access preambles comprises 64 random access preambles.

15. A communication method, comprising:
 receiving, by a terminal apparatus in a wireless communication network from a base station, cyclic shift increment configuration information indicating a cyclic shift increment value $N_{CS}$ ($N_{CS}$ value), the $N_{CS}$ value belonging to a set of cyclic shift increments including non-zero cyclic shift increments $N_{CS}(k)$; and
 sending, by the terminal apparatus to the base station, a random access preamble related to the $N_{CS}$ value indicated by the cyclic shift increment configuration information; and
 wherein $N_{CS}(k)$ satisfies following formula:

$$N_{CS}(k)=\lfloor N_{ZC}/[N_{pre}(0)\times a^k+a/(1-a)\times(a^k-1)]\rfloor, k=0,1,2\ldots K;$$

wherein $\lfloor N_{ZC}/[N_{pre}(0)\times a^k+a/(1-a)\times(a^k-1)]\rfloor$ denotes a maximum integer not greater than $\lfloor N_{ZC}/[N_{pre}(0)\times a^k+a/(1-a)\times(a^k-1)]\rfloor$, $[N_{pre}(0)\times a^k+a/(1-a)\times(a^k-1)]$ denotes a nearest integer to $N_{pre}(0)\times a^k+a/(1-a)\times(a^k-1)$, $N_{pre}(0)=64$, $N_{zc}$ denotes a length of a Zadoff-Chu sequence corresponding to the random access preamble, and K=14; and wherein a=0.856 or a satisfies following formula:

$$2 = 64 \times a^{14} + \frac{a}{1-a}(a^{14}-1).$$

16. The communication method according to claim 15, wherein the set of cyclic shift increments further includes a $N_{CS}$ value of 0, and the $N_{CS}$ value of 0 in the set of cyclic shift increments indicates that one preamble sequence is generated from one root sequence.

17. The communication method according to claim 15, wherein the random access preamble belongs to a set of random access preambles.

18. The communication method according to claim 17, wherein the set of random access preambles is derived from at least one Zadoff-Chu sequence.

19. The communication method according to claim 18, wherein the at least one Zadoff-Chu sequence is used in generation of a sequence $x_{u,v}(k)$ for the set of random access preambles, and the sequence $x_{u,v}(k)$ is given by:

$x_{u,v}(k)=x_u((k+vN_{CS})\bmod N_{ZC})$, where u and v are integers, $N_{ZC}$ is a length of the at least one Zadoff-Chu sequence, $x_u(k)=e^{-j\pi uk(k+1)/N_{ZC}}$, $k=0, 1, \ldots, N_{ZC}-1$, and $j=\sqrt{-1}$.

20. The communication method according to claim 18, wherein random access preambles derived from a same Zadoff-Chu sequence in the set of random access preambles have zero correlation zones of a length $N_{CS}-1$.

21. The communication method according to claim 17, wherein the set of random access preambles comprises 64 random access preambles.

22. A terminal apparatus, comprising:
 a processor; and
 a non-transitory computer readable storage medium storing programming for execution by the processor coupled to the storage medium, the programming including instructions that direct the terminal apparatus to:

receive, from a base station, cyclic shift increment configuration information indicating a cyclic shift increment value $N_{CS}$ ($N_{CS}$ value), the $N_{CS}$ value belonging to a set of cyclic shift increments including non-zero cyclic shift increments $N_{CS}(k)$; and send, to the base station, a random access preamble related to the $N_{CS}$ value indicated by the cyclic shift increment configuration information; and wherein $N_{CS}(k)$ satisfies following formula:

$N_{CS}(k) = \lfloor N_{ZC}/[N_{pre}(0) \times a^k + a/(1-a) \times (a^k-1)] \rfloor, k=0, 1, 2 \ldots K;$ wherein $\lceil N_{ZC} [N_{pre}(0) \times a^k + a/(1-a) \times (a^k-1)] \rceil$ denotes a maximum integer not greater than $N_{ZC} [N_{pre}(0) \times a^k + a/(1-a) \times (a^k-1)]$, $[N_{pre}(0) \times a^k + a/(1-a) \times (a^k-1)]$ denotes a nearest integer to $N_{pre}(0) \times a^k + a/(1-a) \times (a^k-1)$, $N_{pre}(0)=64$, $N_{zc}$ denotes a length of a Zadoff-Chu sequence corresponding to the random access preamble, and K=14; and wherein a=0.856 or a satisfies following formula:

$$2 = 64 \times a^{14} + \frac{a}{1-a}(a^{14} - 1).$$

23. The terminal apparatus according to claim 22, wherein the set of cyclic shift increments further includes $N_{CS}$ value of 0, and the $N_{CS}$ value of 0 in the set of cyclic shift increments indicates that one preamble sequence is generated from one root sequence.

24. The terminal apparatus according to claim 22, wherein the random access preamble belongs to a set of random access preambles.

25. The terminal apparatus according to claim 24, wherein the set of random access preambles is derived from at least one Zadoff-Chu sequence.

26. The terminal apparatus according to claim 25, wherein the at least one Zadoff-Chu sequence is used in generation of a sequence $x_{u,v}(k)$ for the set of random access preambles, and the sequence $x_u,v(k)$ is given by:

$x_{u,v}(k)=x_u((k+vN_{CS}) \mod N_{ZC})$, where u and v are integers, $N_{ZC}$ is a length of the at least one Zadoff-Chu sequence, $x_u(k)=e^{-j\pi uk(k+1)/N_{ZC}}$, $k=0, 1, \ldots, N_{ZC}-1$, and $j=\sqrt{-1}$.

27. The terminal apparatus according to claim 25, wherein random access preambles derived from a same Zadoff-Chu sequence in the set of random access preambles have zero correlation zones of a length $N_{CS}-1$.

28. The terminal apparatus according to claim 24, wherein the set of random access preambles comprises 64 random access preambles.

* * * * *

UNITED STATES PATENT AND TRADEMARK OFFICE
CERTIFICATE OF CORRECTION

PATENT NO. : 10,986,536 B2
APPLICATION NO. : 16/878455
DATED : April 20, 2021
INVENTOR(S) : Mauritz It is certified that error appears in the above-identified patent and that said Letters Patent is hereby corrected as shown below:

In the Claims

In Column 10, Line 42, Claim 1, delete

"wherein $\lfloor N_{ZC}/[N_{pre}/(0) \times a^k + a/(1-a) \times (a^k - 1)] \rfloor$" and insert -- wherein $\lfloor N_{ZC}/[N_{pre}(0) \times a^k + a/(1-a) \times (a^k - 1)] \rfloor$ --.

In Column 11, Line 34, Claim 8, delete

"wherein $\lfloor N_{ZC}\ [N_{pre}/(0) \times a^k + a/(1-a) \times (a^k - 1)] \rfloor$" and insert --wherein $\lfloor N_{ZC}/[N_{pre}(0) \times a^k + a/(1-a) \times (a^k - 1)] \rfloor$ --.

In Column 12, Line 52, Claim 19, delete

"$x_u(k) = e^{-j\pi k(k+1)/N_{ZC}}, k=0, 1, \ldots, N_{ZC}-1$" and insert -- $x_u(k) = e^{-j\pi u k(k+1)/N_{ZC}}, k=0,1,\ldots, N_{ZC}-1$ --.

In Column 13, Line 12, Claim 22, delete

"wherein $\lceil N_{ZC}\ [N_{pre}(0) \times a^k + a/(1-a) \times (a^k - 1)] \rfloor$" and insert --wherein $\lfloor N_{ZC}/[N_{pre}(0) \times a^k + a/(1-a) \times (a^k - 1)] \rfloor$ --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,986,536 B2

In Column 13, Lines 13-14, Claim 22, delete "maximum integer not greater than $N_{ZC}$ [$N_{pre}(0) \times a^k + a/(1-a) \times (a^k-1)$]" and insert --a maximum integer not greater than $N_{ZC} / [N_{pre}(0) \times a^k + a/(1-a) \times (a^k-1)]$--.